United States Patent [19]

Harris, Jr.

[11] Patent Number: 5,872,615
[45] Date of Patent: Feb. 16, 1999

[54] MOTION PICTURE PRESENTATION SYSTEM

[76] Inventor: Robert Crawford Harris, Jr., 3508 Oak Ridge Dr., Chattanooga, Tenn. 37415

[21] Appl. No.: 940,329

[22] Filed: Sep. 30, 1997

[51] Int. Cl.$^6$ ................................................ G03B 31/00
[52] U.S. Cl. .............................. 352/25; 352/92; 352/123
[58] Field of Search .............................. 352/25, 92, 123; 472/61; 364/140

[56] References Cited

U.S. PATENT DOCUMENTS

| | | | |
|---|---|---|---|
| 3,602,582 | 8/1971 | Torricelli | 352/40 |
| 3,609,020 | 9/1971 | Kelly | 352/92 |
| 3,663,826 | 5/1972 | Schumann et al. | 307/49 |
| 3,684,358 | 8/1972 | Boudouris et al. | 352/25 |
| 4,050,794 | 9/1977 | Shields, Jr. | 352/12 |
| 4,120,572 | 10/1978 | Grallert et al. | 352/92 |
| 4,183,632 | 1/1980 | Nutting et al. | 352/17 |
| 4,256,389 | 3/1981 | Engebretson | 352/92 |
| 4,385,814 | 5/1983 | Elliott | 352/92 |
| 4,591,248 | 5/1986 | Freeman | 352/133 |
| 4,703,412 | 10/1987 | Cunningham et al. | 364/140 |
| 4,839,733 | 6/1989 | Karamon et al. | 358/341 |
| 4,942,488 | 7/1990 | Osawa | 360/80 |
| 5,160,949 | 11/1992 | Marglin | 352/92 |

OTHER PUBLICATIONS

"Device" (description and photograph), 2 pgs.

Primary Examiner—Russell Adams
Attorney, Agent, or Firm—Luedeka, Neely & Graham, P.C.

[57] ABSTRACT

A microprocessor-based system for controlling the presentation of a motion picture film in a theater having sound, lens, masks, and light systems with controllers for switching between the various modes or settings of the systems. The microprocessor-based system receives, stores and outputs information relating to desired operational settings along with the various times at which these settings are to be adjusted as a function of time relative to the start of the film.

8 Claims, 9 Drawing Sheets

MOTION PICTURE PRESENTATION SYSTEM

FIELD OF THE INVENTION

This invention relates generally to the presentation of motion pictures. More particularly, the present invention relates to a system for the presentation of motion pictures which enables enhanced control over variables associated with the presentation of motion picture films.

BACKGROUND AND SUMMARY OF THE INVENTION

Sensory components or variables associated with the presentation of motion pictures, such as lights, speaker output, mask position and lens settings are typically controlled either manually or through the use of cue tape attached to the film. Manual control of the sensory components is disadvantageous in that it requires a film operator to be available and alert throughout each and every showing of the film to control the sensory components within the theater.

The use of cue tape is also disadvantageous in that it offers limited control over presentation variables and installation or replacement of the cue tape is time consuming and inconvenient and involves handling of the film which often transfers dirt and other matter onto the film which can scratch the film. For example, cue tape enables control over only a few variables at the beginning and end of the film and dirt and scratches which may result from handling of the film during installation or replacement of cue tape are greatly magnified by the projector and detract from the quality of the presentation. Also, if the cue tape wears out before replacement, an audience may experience undesirable performance such as the lights not dimming, or an incorrect sound mode output.

Accordingly, it is an object of the present invention to provide an improved system for controlling the presentation of motion pictures.

It is another object of the invention to provide a system of the character described which offers enhanced control over presentation parameters as compared to prior systems such as those using cue tape.

Still another object of the invention is to provide a system of the character described which enables enhanced control over presentation variables as compared to prior systems.

An additional object of the invention is to provide a system of the character described which avoids the use of cue tape.

Another object of the invention is to provide a system of the character described which is programmable and editable.

Yet another object of the invention is to provide a system of the character described which is economical, uncomplicated and convenient to use.

Regarding the foregoing and other objects, the present invention is directed to a system for enhancing the presentation of a motion picture film.

In a preferred embodiment, the invention includes a plurality of theater operation systems and an output controller operatively associated with the theater systems and having operating parameters corresponding to a plurality of desired operational parameters associated with each of the theater operation systems.

A presentation controller in electrical communication with the output controller means is provided for selectively controlling the desired operational parameters as a function of time. The presentation controller includes a microprocessor in electrical communication with a clock, an input device in electrical communication with the microprocessor for inputting information, corresponding to selected ones of the desired output parameters into the presentation controller by an operator as a function of time as measured from the commencement of the presentation of the motion picture film, the input device generating input signals in response to the input information. Computer memory is disposed in the microprocessor for storing the input signals as a function of time and a display, such as an LCD, is provided for displaying to the operator the desired operational parameters as a function of time.

The microprocessor generates output signals at desired times corresponding to the input signals, with the output controller device being responsive to the output signals so that the operational parameters of the theater operation systems correspond as a function of time to the desired operational parameters.

For example, preferred theater operational systems include the sound, lens and light systems of the theater and controllers for switching between the various modes or settings. Preferably, such systems include sound, lens and light systems, with the sound system having various desired outputs such as mono or stereo or digital and an electrical switch for selecting among these, the lens system having a flat lens and a scope lens selectable by an electric switch, and the light system having floor lights, perimeter lighting and the like and including dimmer switches for varying the intensity of the lighting. As will be appreciated, the microprocessor enables control over these and other theater operation systems including, but not limited to the position of the curtains and masks and whether the projector is on or off, by programming of the various times at which these settings are to be adjusted as a function of time relative to the start of the film.

In this manner, an operator may program in the start times of various films and, in an initial viewing, program in the desired changes in the operational parameters such that thereafter, all the operator must do is to thread the film into the projector prior to the start time. Thereafter, the presentation system can start the projector, make the desired operational settings at the designated times and shut off the projector at the end of the film. Editing of the times or selected operational parameters may thereafter be made if desired requiring re-input of the remaining settings.

As will be appreciated, the invention overcomes many of the disadvantages and features of the prior art by providing a system that is both programmable and editable and which enables automatic control over the presentation of a motion picture film.

Further in this regard, it will be appreciated that the invention enables an operator during an initial viewing of a film to input information corresponding to desired parameters of the viewing environment. For example, at each stage of the viewing of the film the operator may select the most appropriate presentation variables and program this information into a microprocessor-based system which repeats the selected viewing criteria during subsequent showings without the need of cue tape or operator intervention. The parameters are selectable via corresponding buttons and indicators and once the system is programmed, all that is necessary is that the operator thread the film into the projector prior to the next showing of the film.

The system of the invention automatically starts the film at the appointed time and adjusts the viewing parameter as a function of time as measured from the start of the film and displays the current operating parameters for inspection by the operator. However, should a change of one or more parameter be desired, this may be readily accomplished via a keypad and an easy to view LCD panel, with the subsequent in time selections being updated to reflect any prior in time change.

For example, if the operator desires to have the house lights brought down to half intensity at the beginning of the previews and brought down to low at the start of the main feature of the film, the operator may program this selection into system by pushing a "lights" button until the selected parameter "half" or "low" is illuminated by a corresponding LED provided on a panel associated with the system. However, should the preview be shortened from 5 minutes, for example, to 4 minutes, the operator may edit the programmed information via the keypad and LCD by scrolling through the programmed information and editing the "low" command to occur at 4 minutes from the start of the film as opposed to 5 minutes as initially input. Likewise, any subsequent events programmed to occur thereafter are automatically shifted in time for 1 minute less such that the presentation parameters are adjusted to reflect that the preview was of 1 minute less duration.

BRIEF DESCRIPTION OF THE DRAWINGS

Other objects, features and advantages of the present invention will become apparent by reference to the following detailed description when considered in conjunction with the accompanying drawings in which.

DETAILED DESCRIPTION

The present invention provides a presentation system 10 which enables programmable, automatic control over presentation of a motion picture film in a movie theater and advantageously eliminates the need for cue tape or constant operator attention.

For example, after an initial viewing of a film during which desired viewing parameters are programmed into the system 10 by an operator, the system 10 enables the projector to automatically start at the desired time and the settings of presentation variables associated with the showing of a motion picture film, such as sound mode, light settings, lens setting, curtain position and speaker settings are automatically adjusted at desired times throughout the presentation of the motion picture without the need for cue tape or operator intervention. Furthermore, the settings are repeated for future viewings of the film such that each showing of the film is just like the last so that the quality of the presentation is consistent. However, should the need arise to adjust one or more settings, this may readily be accomplished.

Figure 1:
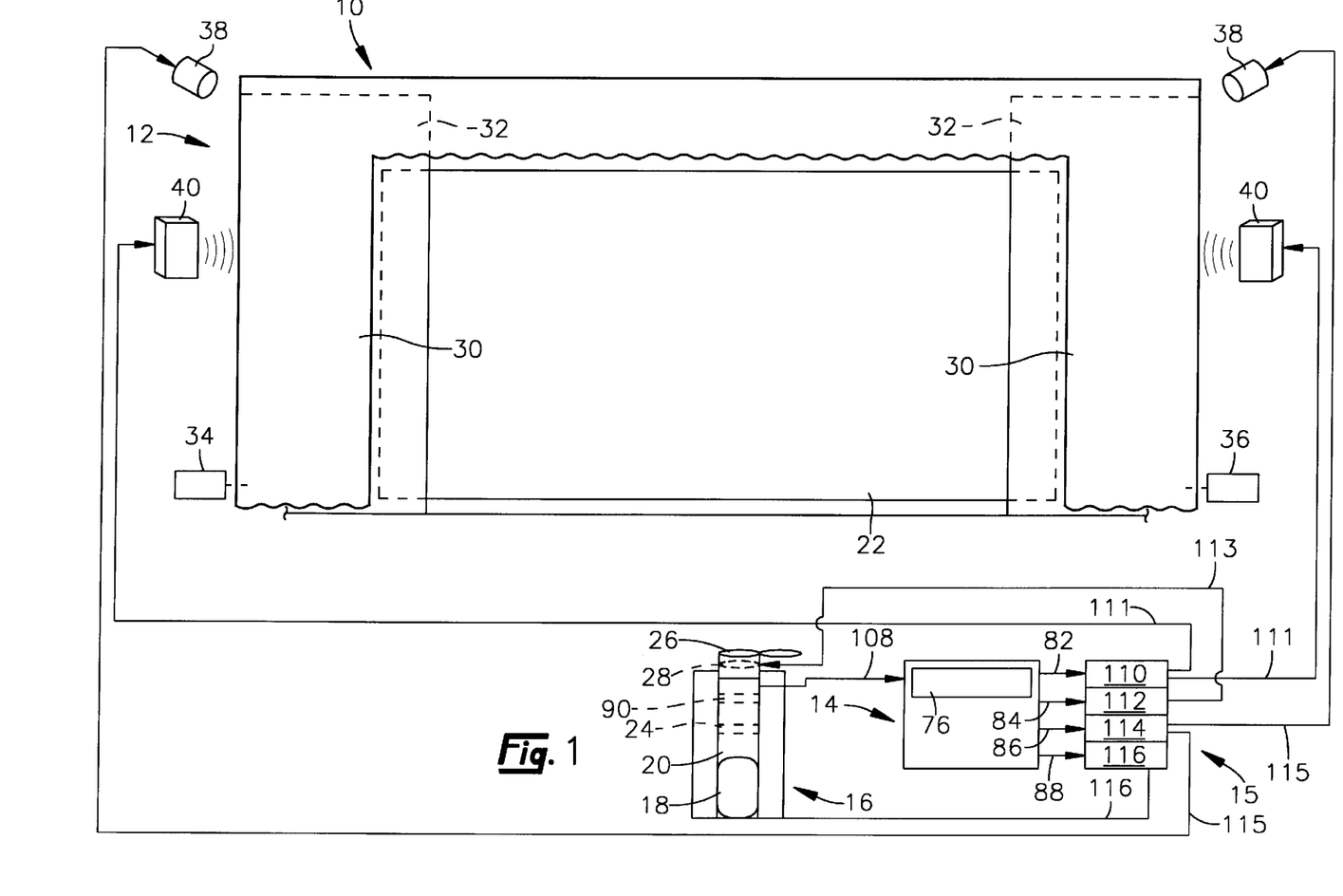
FIG. 1 is a representational view of an auditorium of a theater showing a motion picture presentation system in accordance with the present invention.
Figure 2A:
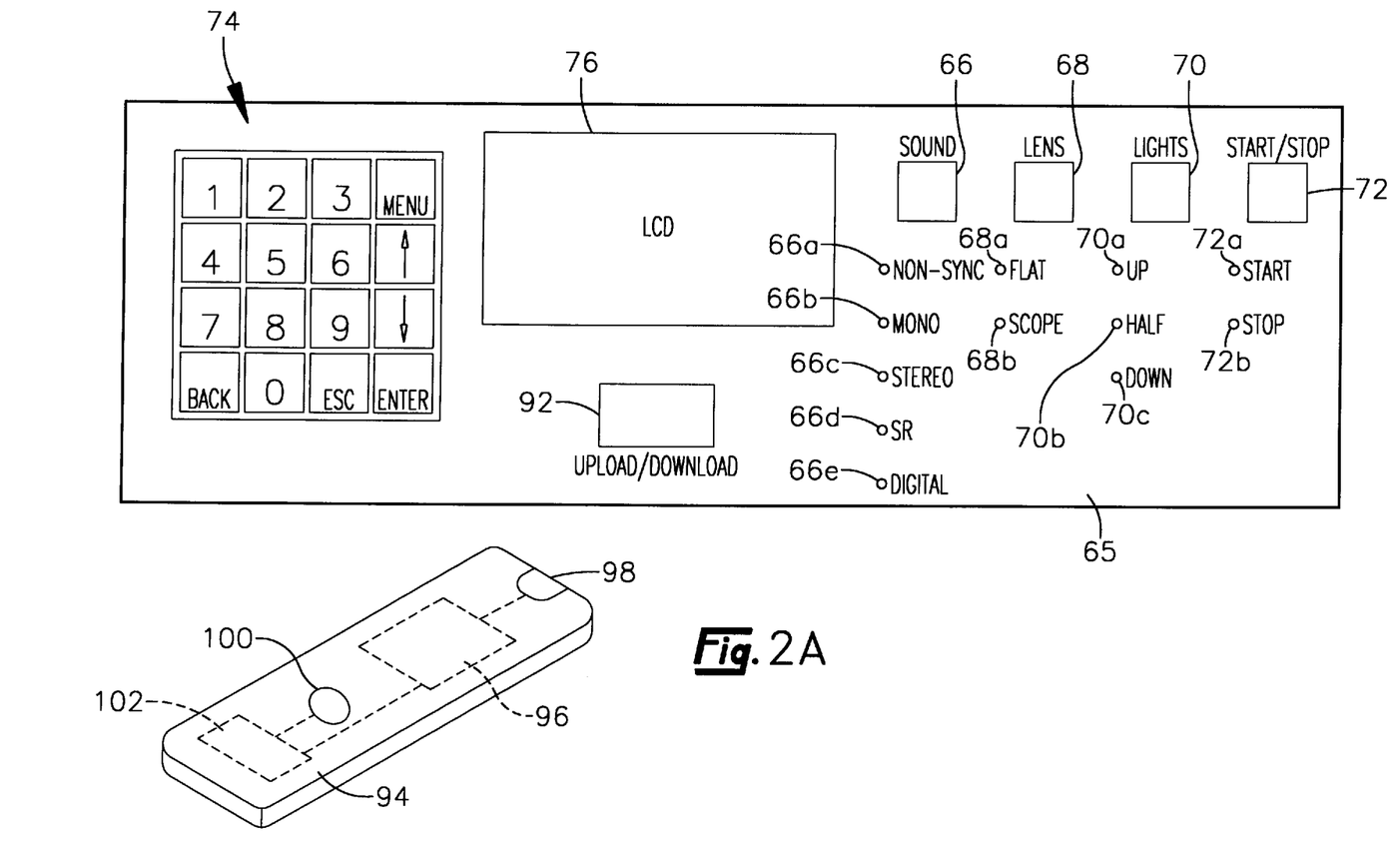
FIG. 2A is a front plan view of components of the system of FIG. 1.
Figure 2B:
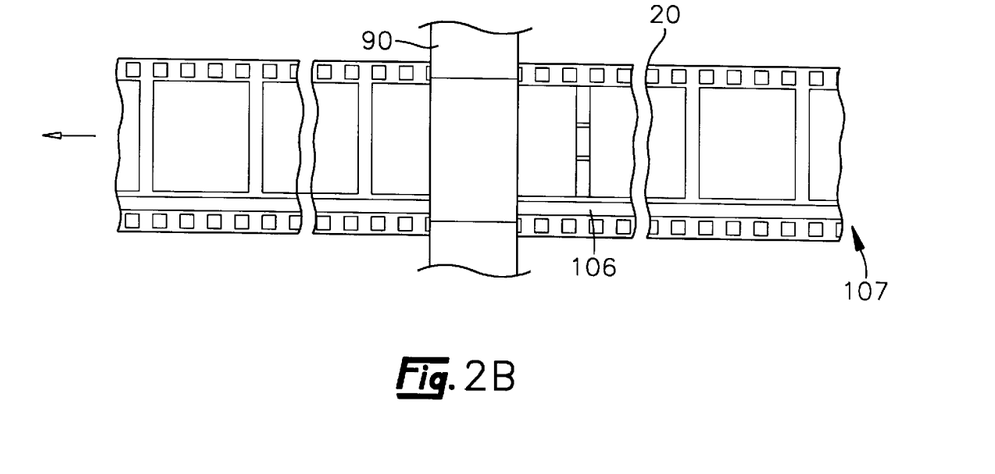
FIG. 2B is a perspective view of a sound signal detector for use with the system of FIG. 1.
Figure 3:
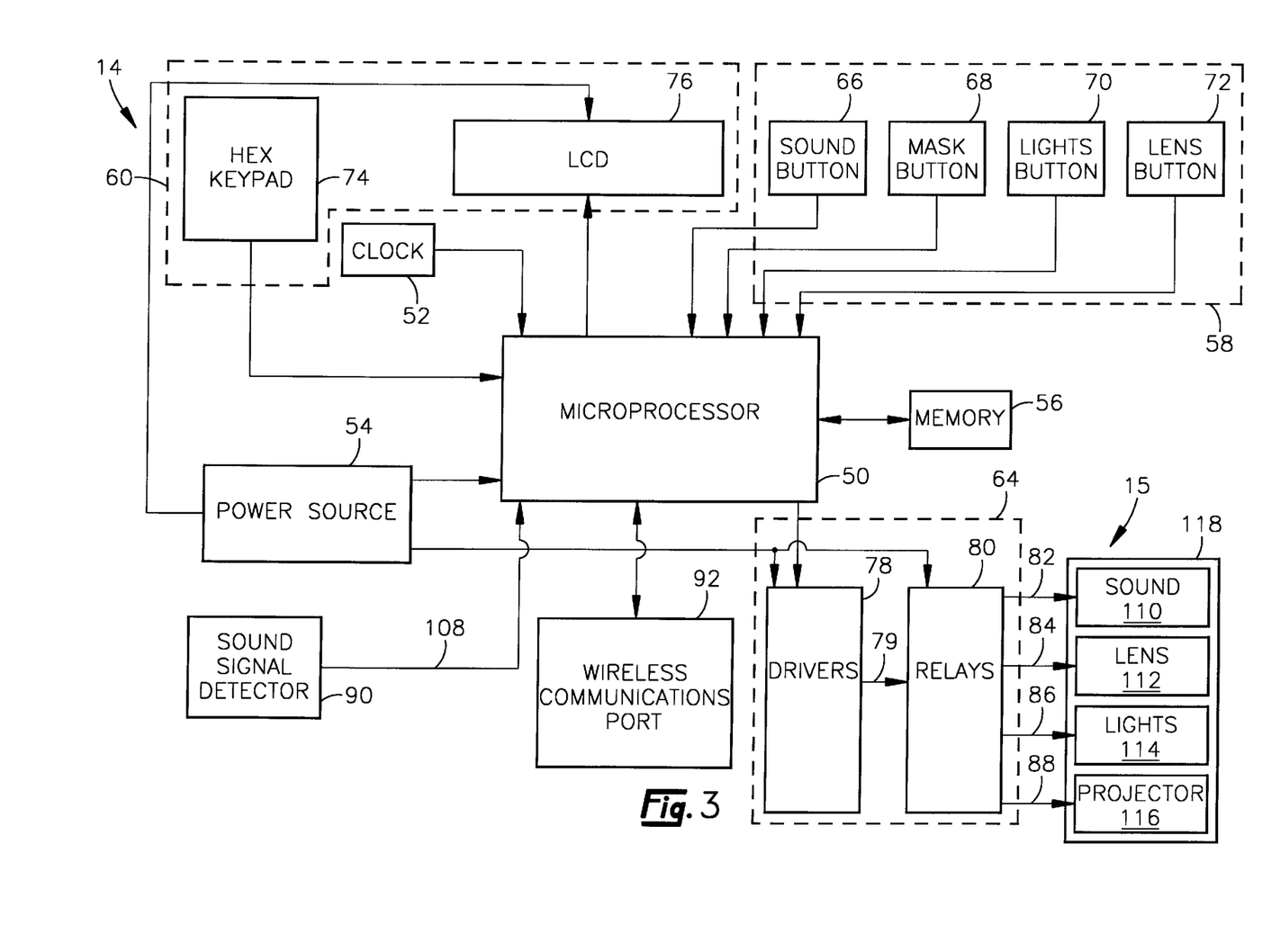
FIG. 3 is a circuit schematic of the microprocessor based system for use in the system of FIG. 1.

With initial reference to FIGS. 1–3, the presentation system 10 preferably includes a cinema or theater 12, a microprocessor-based system 14 for outputting signals corresponding to desired presentation parameters and an interface system 15 for interfacing between the system 14 and the theater 12 to enable automatic control over the presentation environment within the theater 12.

The Theater 12

Returning to FIG. 1, the theater 12 preferably includes a projector 16, such as a 35 mm movie projector, located at the rear of the theater and including a film reel 18 containing a motion picture film 20. The projector casts or projects images of the film onto a screen 22 for viewing by an audience seated in seats located in front of the screen 22. The projector 16 includes a light source 24 and an electrically switchable lens system 26 for projecting light through frames of the film 20 and focusing the output light so that light images corresponding to images on the film are cast onto the screen 22 for viewing by the audience. It is appreciated that the projector 20 may also be a VCR, DVD player, or laser disc player or other device for presenting moving images or "motion pictures."

The screen 22 is preferably a standard film screen having sufficient width and height to accommodate images cast thereon via the lens 26. The lens system 26 preferably includes a flat lens and a scope lens and a switch such as motorized latch 28 for switching between the flat lens and the scope lens. For example, the flat lens is preferably used during presentation of movie previews or advertisements and the scope lens is preferably used during presentation of the feature film. Thus, lens selection represents one variable of the presentation of the motion picture.

An additional presentation variable involves the position of curtains 30 and masks 32 disposed between the curtains 30 and the screen 22. The curtains 30 preferably drape the entire screen 22 when closed and may be provided by decorative fabric to add to the aesthetics of the theater. The masks 32 are preferably provided by a darkly colored sheer fabric for partially covering side portions of the screen 22 where images of the film typically are not cast. Typically, the curtains 30 are opened fully when the projector is turned on and fully closed when the projector is turned off. In this regard, a motorized positioning system 34, such as a motor-operated cable slide connected to the curtain hangers and having switch settings corresponding to the open and closed curtain positions, may be provided to slidably position the curtains 30.

The masks 32 are also preferably slidably positionable as by similarly configured motorized positioning system 36 to enable the masks 32 to be positioned as desired. For example, when a flat lens which projects a narrower image is used, the masks are preferably positioned closer to the center of the screen 22 and the masks 32 moved outward to widen the viewing area of the screen when a scope lens is used. Likewise, the masks are preferably fully closed when the curtains are drawn shut as when the projector is off.

The theater 12 also preferably includes a light system 38 for selective illumination of all or segments of the auditorium. Lights may be positioned on the walls of the theater, around the periphery of the ceiling and adjacent walkways between seat aisles. The lights may be varied as by dimmer switches automatically controlled by the system 10 during the presentation of the film both in presence and intensity, providing yet another presentation selection.

For example, before the start of the film floor or walkway lights may be operated at fall intensity and then operated at half intensity during the previews to aid late-comers to find a seat and adjusted to a further dimmed or down setting during presentation of the feature film. Likewise, all lights are preferably brought up to half-intensity during the showing of the credits to facilitate exiting of members of the audience who wish to leave at this time while still providing sufficient darkness to enable viewing of the credits. Thereafter, the lights may be brought up to full intensity to signal that it is time to leave and to provide full lighting for cleaning of the theater before the next presentation.

A speaker system 40 having a plurality of speakers for outputting the sound at the desired level and mode is also preferably provided in the theater 12 for emitting sound associated with the motion picture. For example, sound converted from sound codes contained on the film via an electronic sound code reader or detector such as the detector 90 associated with the projector and described subsequent hereto in connection with FIG. 2B. The sound mode output through via the speaker system, analog, e.g., non-sync, mono, stereo, SRS or digital, thus represents yet another presentation variable.

The Microprocessor-based System 14

Desired operation parameters or control functions for the above and other electronically controllable presentation variables associated with the showing of motion pictures may be selected and/or otherwise input for use with the system 10 by an operator via the microprocessor-based system 14, which, with reference to FIG. 3, preferably includes a microprocessor 50 timed by and coupled to a clock 52, a power supply or source 54, memory 56, a parameter indication/selection system 58, user interface 60 and relay/driver interface system 64. The electronic components of the system 14 are preferably protected in a housing having a front panel 65 configured as shown in FIG. 2A for ease of use by non-technically trained individuals.

The microprocessor 50 is preferably an 8-bit microprocessor such as is available under Model No. PK16C65 from Microchip, Inc. of Chandler, Ariz. A preferred clock 52 is available under Model No. OS 1642 from Dallas Semiconductor, Inc. of Dallas, Tex. The clock 52 preferably includes a non-volatile RAM module for storing control functions input by the operator. The control functions may also be stored in memory 56. The power source or supply 54 preferably includes a voltage regulator and a transformer for receiving 12 V AC input and is in electrical communication with the microprocessor 50 for providing power thereto.

Returning to FIGS. 1, 2A and 3, the parameter indication/selection system 58 is electrically coupled to the microprocessor 14 and preferably includes buttons, switches or other selection devices which enable the operator to select operational parameters corresponding to desired settings of presentation variables, such as sound, mask, lights and lens. In this regard, the system 58 preferably includes sound button 66, lens button 68, light button 70 and projector button 72 for manipulation by the operator during the showing of a film to select desired operating parameters. The buttons 66–72 may be used by an operator to program the system 14 in the "learn" mode as set forth in more detail below.

Indicators operatively associated with the buttons 66–72 are preferably provided adjacent each selection button for indicating the selectable parameters and the status of the selected parameters. For example, lights such as LEDS 66a–66e or other indication devices corresponding to selectable parameters are preferably electrically coupled with the sound button 66 such that pressing of the sound button sequentially lights up one of the LEDs 66a–66e to indicate the selected parameter. As shown in FIG. 2, LED 66a corresponds to Non-Sync sound mode, LED 66b corresponds to Mono sound mode, LED 66c corresponds to Stereo sound mode, LED 66d corresponds to SR sound mode and LED 66e corresponds to Digital sound mode. Each button and LED preferably includes indicia in close proximity thereto, preferably in light-reflective paint, corresponding to the parameter as shown in FIG. 2.

By pressing the button 66 the operator may sequentially cycle through the selection parameters with the lit LED indicating the selected parameter. A delay, such as a timer, is preferably provided in line with the button circuitry to enable the operator to cycle through the parameters, with the parameter not becoming the selected parameter until a preselected time interval, such as from about 2 to about 5 seconds, has passed. That is, a signal corresponding to the selected parameter will not be sent to the microprocessor and memory until after the delay period.

For each selected operating parameter, the system 14 generates an output signal corresponding to the stored parameter at the selected time relative to the start of the film such that each operating parameter as selected by the operator during an initial showing of the film is automatically selected at the appropriate time during subsequent showing of the film.

Likewise, buttons 68–72 preferably have associated LEDs as follows:

| Button | LED | Parameter/mode |
| --- | --- | --- |
| 68 | 68a | lens/flat |
| 68 | 68b | lens/scope |
| 70 | 70a | lights/up |
| 70 | 70b | lights/half |
| 70 | 70c | lights/down |
| 72 | 72a | projector/start |
| 72 | 72b | projector/stop |

As will be appreciated, other and further indicia and corresponding control buttons and associated circuitry may be provided as desired, such as for controlling other operational parameters such as the masks, curtains and even special sensory components, such as the release of mist, fans, air conditioning and heating.

For example, during the showing of a movie concerning a fire, it may be desirable to direct heated air toward the audience at desired times to enhance the viewing experience. In particular, the interface 60 enables the operator to input information concerning the start times of films to be shown and to edit information previously input during the "learn" mode. Thus, a heater positioned in the theater may be automatically controlled using the system 10 to provide this effect as by including a button having on and off as selectable parameters to store information in the memory of the system 14 which may be used to generate a signal for operating the heater at desired times as measured from the start time of the film.

The user interface 60 preferably includes a keypad 74 and display panel 76. The keypad 74 is in electrical communication with and interfaces with the microprocessor and is preferably a hex keypad having, buttons bearing numbers 0–9, a "menu" button an "↑" button, an "↓" button, a "back" button, an "ESC" button, and an "Enter" button. The panel 76 is preferably a liquid crystal display (LCD) panel which is likewise in electrical communication with the microprocessor 50 and is powered by the power supply 54 for displaying various alpha-numeric lines of text to the operator. Preferably, the LCD panel 76 has four lines of 20 alpha-numeric characters each. The LCD panel 76 is preferably backlit for ease of viewing in a darkened sound booth.

As will be appreciated, the interface 60 enables the operator to input and edit the desired starting times and ending times of a plurality of shows and further enables the operator to adjust selection parameters previously made by the operator for each show via the buttons 66–72.

For example, during the programming of the system 14 in the "learn" mode which is accessed via the keypad 74, the operator may initially select a flat lens at the beginning of the film (during the previews) and switch to a scope lens by pressing the lens button 68 to illuminate LED 68b at the start of the main feature which, for the purpose of an example, is 3 minutes and 20 seconds after the projector is turned on. Continuing further with the example, the operator may decide to change the preview portion of the film and replace the preview portion with a new preview portion which has a running time of 4 minutes. The keypad 74 enables the operator to reprogram the input information by cycling through the previous selection parameters as viewed via LCD 76 until the one for which change is desired is observed. At this point, via the keypad 74, the operator reprograms the time for the lens adjustment to 4 minutes from the start of the film as opposed to the 3 minute 40 second time as originally input, thus accounting for the additional 20 seconds of the new preview.

The new information is stored in the memory of the system 14 in place of the prior information and the operator via the keypad 74 may further instruct the system 14 to shift all subsequent parameter changes ahead by 20 seconds such that the other parameters which follow the lens shift are in sync relative to the start of the film. That is, a sound mode shift previously selected to occur at, for example 20 minutes from the start of the film, would thus be shifted automatically to 20 minutes and 20 seconds as measured from the start of the film and shutting off of the projector and raising of the lights would occur 20 seconds past the originally input time for this action.

The driver/relay system 64 enables output signals from the microprocessor generated in response to the selection criteria input by the operator to be transferred to the interface 15 for implementation of changes in operation of the speaker system, light system, lens system or other presentation features. In this regard, the system 64 is preferably powered by the supply 54 and includes drivers 78 coupled as at 79 to corresponding relays 80 which are also preferably powered by the power source 54. The relays 80 preferably include switches, such as double pull/double throw switches, that are coupled to the interface system 15 as by electrical lines 82–88. All circuitry is preferably shielded against EMI/RFI.

It is to be appreciated that the lines 82–88 are available to forward information corresponding to output signals of the system 14 to the interface 15 for corresponding control of equipment in the theater in accordance with the criteria input into the system 14 by the operator. Thus, in a preferred embodiment, line 82 may carry information concerning sound settings, line 84 may carry information as to the lens setting, line 86 may carry light setting information and line 88 may carry information concerning the operation of the projector, i.e., starting and stopping thereof. As will be appreciated, more or fewer lines may be provided depending on the operational parameters to be controlled. Thus, if buttons, LEDs and circuitry were provided for control of the curtains, masks, or other equipment, e.g., a heater, then corresponding lines could be provided to the interface 15 for control of this equipment by the system 14.

The system 14 may further include a sound signal detector 90 and a wireless communications port 92 including an infrared or RF transmitter/receiver. As shown in FIG. 2A, a remote transfer device 94 having a memory module 96 stored therein and a wireless communications port 98 mounted thereon may be provided for communicating control functions that are uploaded to, or downloaded from, the wireless communications port 92 mounted on the microprocessor based system 14.

The remote transfer device 94 preferably includes an on/off button 100 coupled to a power source 102, such as a 9 volt battery. The power source 102 is preferably electronically coupled to the memory module 96, which in turn may be electronically coupled to the wireless communications port 98. The wireless communications port 98 of the remote transfer device 94 is preferably an infrared or RF transmitter/receiver which matches the type of wireless communications port 92.

The remote transfer features of the invention enables convenient relocation of stored information to a different system 14 in use in a multiplex theater. For example, if there has been a decrease in attendance for the film showing in the theater where the microprocessor based system 14 is located, the film may be moved to a smaller auditorium or theater and still operate with the same control functions without the need of reprogramming the system. In this regard, the control functions may be uploaded from the microprocessor based system 14 to the remote transfer device, with the control functions stored in the memory of the remote transfer device. The remote transfer device may then be taken by the operator to another theater and downloaded to another microprocessor based system remotely located from the microprocessor based system 14 for automatically controlling desired presentation parameters.

As shown in FIGS. 1 and 2B, the system 10 the optional sound signal detector 90 associated with the microprocessor based system 14, is preferably connected by an electrical lead to the system 14 such that the actual detector is remotely mounted on the projector 20 adjacent to the film reel 18. The detector 90 may be utilized to sense the start or beginning of the film, by sensing a sound or other code placed on the lead of the film. For example, the sound signal detector may be used to detect a sound code 106 stored on a soundtrack 107 contained on the film and send the sound code 106 to the microprocessor based system 14 via lead 108, as shown in FIG. 3. From the sound code 106, the microprocessor based system 14 can distinguish via software contained within the memory module whether the sound code is digital or analog. Moreover, once the microprocessor based system determines whether the sound code is digital or analog, the system 14 may then generate a signal to select among outputting via the speaker system three different types of analog and three types of digital sound modes and thus change control functions of the audio content of the film.

Currently, the three most common types of analog sound modes that are used in theaters are mono, stereo, and surround sound; while the three types of digital sound codes used in theaters are known by the acronyms SDDS, DTS, and DD. In operation, a laser passes through the film reel where the sound code is located and the sound code is detected by the sound signal detector. Once the microprocessor based system 14 receives the sound code and determines whether it is analog or digital, the microprocessor based system can automatically control the operation of the sound system 40 based upon the sound code during showing of the film and select between sending a digital sound signal and an analog sound signal based upon the sound code.

The Interface System 15

As noted previously, the interface system 15 may be used to link the microprocessor-based system 14 to the various electrically controllable devices within the theater 12 over which control may be exercised, such as the masks, light system, lens system, speaker system or other electrically-controllable device within the theater. Thus, in a preferred embodiment, the system 15 preferably includes a sound panel 110 connected to the system 14 by line 82 and to the sound system 40 by lines 111, a lens panel 112 connected to the system 14 by line 84 and to the lens system 26 by line 113, a light 114 panel connected to the system 14 by lead 86 and to the light system 38 by lines 115 and a projector panel 116 connected to the system 14 by line 88 and to the projector by line 117.

As used herein, the term "panel" refers to and includes control devices of the type having one or more switches or laches which respond to electrical signals for changing settings of the switch or latch suitable for controlling operation of the equipment it is connected to. For example, light control panel 116 preferably contains a dimmer switch of the type commonly used to turn lights on and off and to adjust their intensity. An example of a preferred switch being a 2 KW dimmer switch available under Model No. 6080 from HI-Tech, Inc. of Florida, or a 4 KW dimmer switch available under Model No. 6080 from HI-Tech, Inc. As a further example, line 117 may represent the power cord of the projector and the switch within the panel 116 being an electrically controllable on/off switch for selectively powering the projector.

It will be appreciated that various and further other panels may be provided, such as for operation of the motor systems 34 and 36 associated with the curtains 30 and masks 32. To enable centralization of electrical cables and electronic switches and controls, the system 15 preferably includes a component rack 118 for housing the various panels 110–116. The component rack 110 and associated panels are preferably powered by a standard 110–220 volt plug from a standard wall outlet and which supplies electrical power to the electromechanical switches within the panels.

Operation

Programing of the system 10 is preferably accomplished during a first showing of the film. For example, during the first showing of a film an operator may manually input control functions into the microprocessor-based system 14 during set time intervals. During the start of a film, when commercials are typically shown, the operator may set the sound to "mono" mode, the masks to "closed", the lights to "half", and the lens to "flat". This may be accomplished by placing the microprocessor based system 14 in a "learn" mode via the "menu" button on the hex keypad as will be discussed in further detail below.

The operator may designate that the projector be turned on at the start times input by the operator via the keypad 74 and for the showing of previews initially set the sound to be in mono, the lens in flat and a particular light settting, e.g., walkway lights brought to half and house lights dimmed. At the beginning of the main feature of the film, after previews, the operator may switch the sound mode to "stereo", the lights to "down", and the lens to "scope" as by pressing control buttons, such as the buttons 66–72 as described previously. At the end of the film, the operator may select that the lights be changed to an "up" position and the projector turned off.

Once the above control functions are programmed into the memory of the microprocessor based system 14, upon each subsequent showing of the film, the system 14 generates output signals at times corresponding to the time at which the change was input by the operator relative to the start of the film. Thus, changes in presentation variables occur during subsequent viewings of the film without operator intervention and in accordance with the criteria selected by the operator during the learn mode.

Figure 4A:
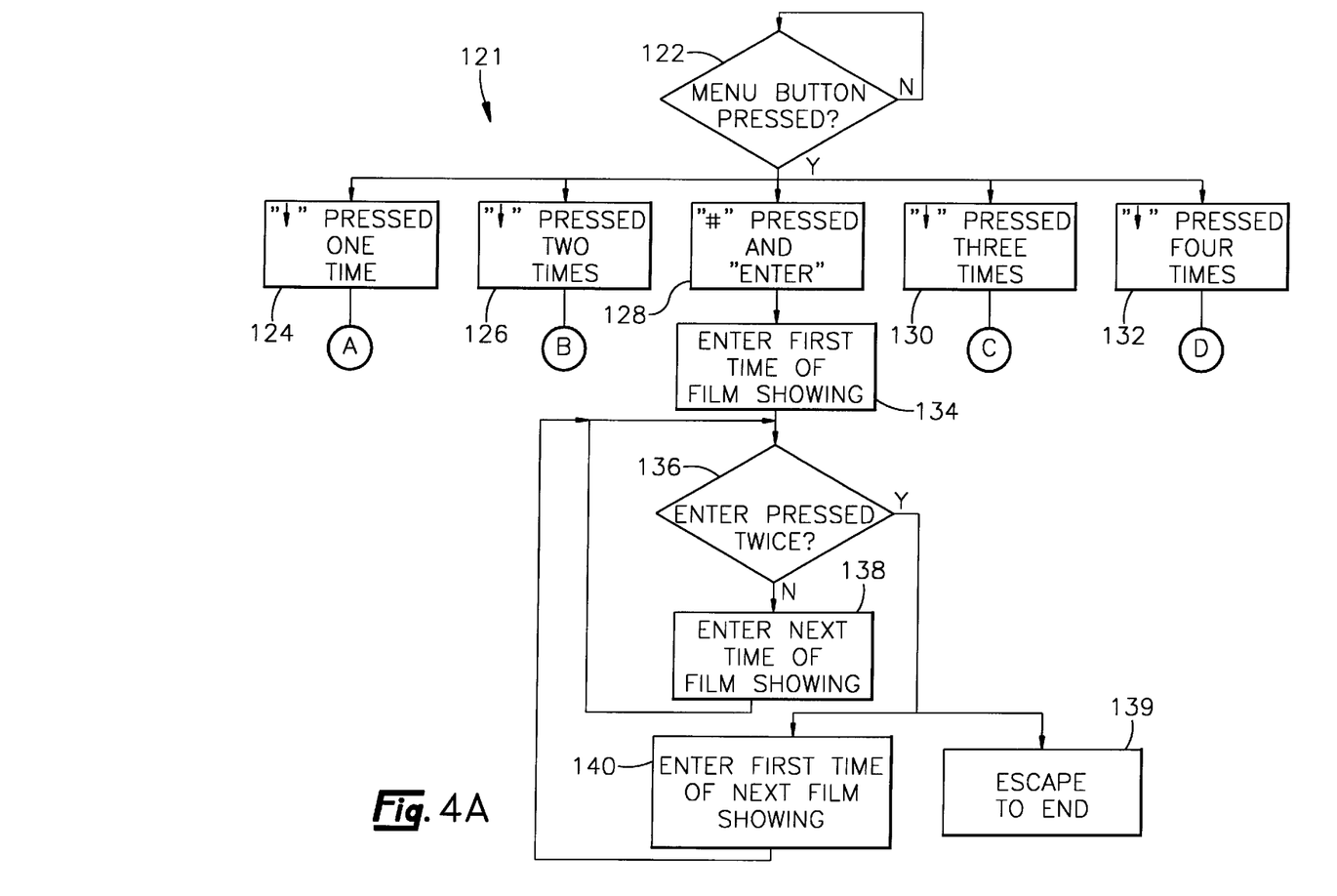
FIGS. 4A, 4B, 4C, 4D and 4E are flow chart diagrams showing preferred operational steps in accordance with the invention.

Referring now to FIG. 4A, a preferred embodiment of logic sequence 121 for use in the invention is shown. Beginning with decision block 122, a determination is made as to whether the "menu" button has been pressed on the hex keypad. If it has not, the sequence simply loops back to the top of decision block 122. If, however, the "Menu" button has been pressed, the sequence proceeds to a row of key-dependant task blocks 124–132. If the "#" button has been pressed along with the "Enter" on the hex keypad in task block 128, the sequence continues to task block 134 whereby the operator is prompted to enter the first time of the showing of the film in a particular theater. The sequence proceeds to decision block 136 whereby it is determined whether the "Enter" button has been pressed twice. If it has, the sequence proceeds to task block 140 whereby the operator is prompted to enter the first time of the next film that may be showing in that theater or the operator may press "ESC" in block 139 to end. The operator can also press the "ESC" button to end the sequence at this point if there are no other films showing in that theater. The sequence then loops back to the top of decision block 136. If, however, it is determined in decision block 136 that the "Enter" button has not been pressed twice the sequence proceeds to task block 138 whereby the operator is requested to enter the next time that the film 16 is showing in that particular theater, such as in the case of the film showing at a matinee time and a late-night time. The sequence then loops back to the top of decision block 136.

Figure 4B:
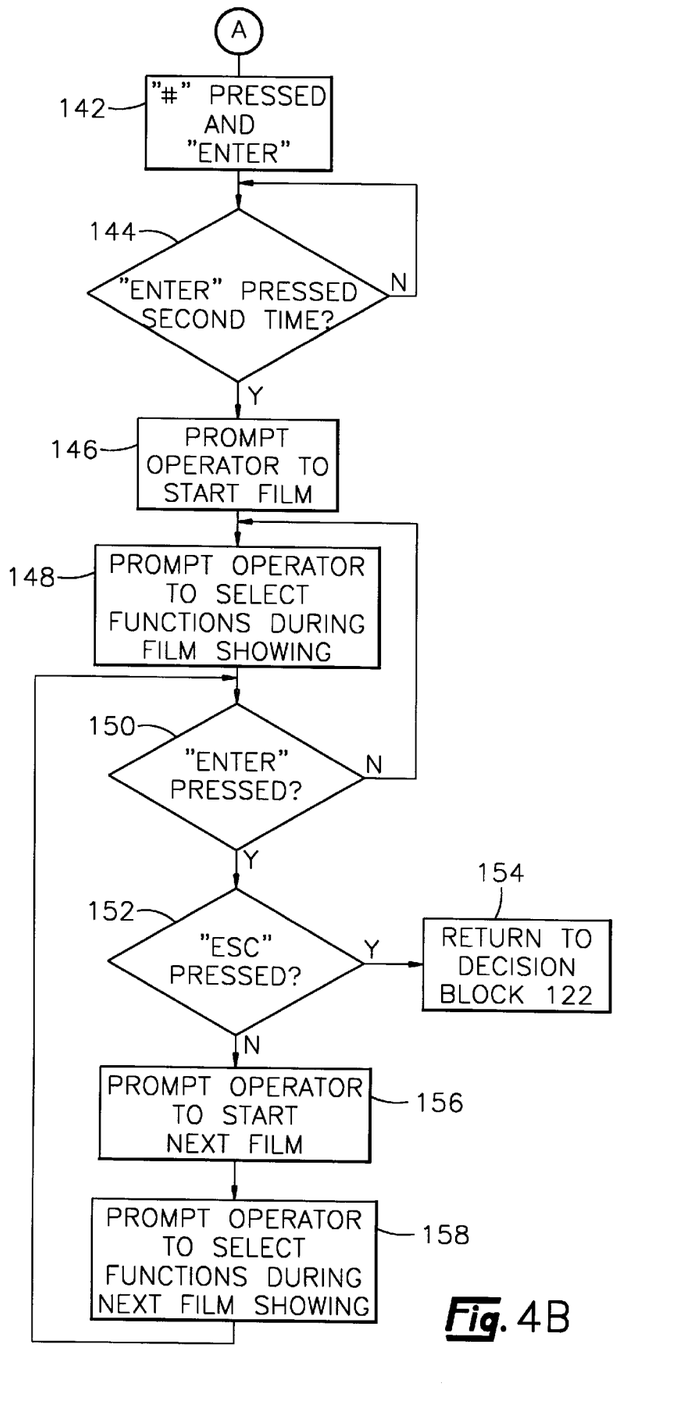

In task block 124, if the "↓" button has been pressed one time by the operator, the sequence continues to task block 142 as shown in FIG. 4B. In task block 142 if the "#" button is pressed by the operator along with "Enter" button the sequence proceeds to decision block 144 whereby it is determined whether the "Enter" button has been pressed a second time. If it has not, the sequence returns to the top of block decision block 144. If, however, it is determined in decision block 144 that the "Enter" button has been pressed a second time the sequence returns to decision block 146 whereby the operator is prompted to start showing the film. This represents time zero or the start of the film from which all subsequent control events are referenced. The sequence then goes to task block 148 whereby the operator is prompted to select the control functions (e.g., light settings, sound, lens and other presentation variables) during showing of the film for the first time.

The sequence then proceeds to decision block 150 whereby it is determined whether the "Enter" button has been pressed by the operator. If it has not, the sequence returns to the top of block 148. If, however, it is determined in decision block 150 that the "Enter" button has been pressed the sequence proceeds to decision block 152 whereby it is determined whether the "ESC" button has been pressed. If it has, the sequence traverses to task block 154 and returns to decision block 122, as shown in FIG. 4A. If, however, the "ESC" button has not been pressed the sequence proceeds to task block 156 whereby the operator is prompted to start the next film that is to be shown in the same theater as the first film such as when two different films are shown at different times in the same theater. The sequence then goes to task block 158 whereby the operator is prompted to select the control functions for controlling the second film as in the first film. The sequence then returns to the top of decision block 150.

Figure 4C:
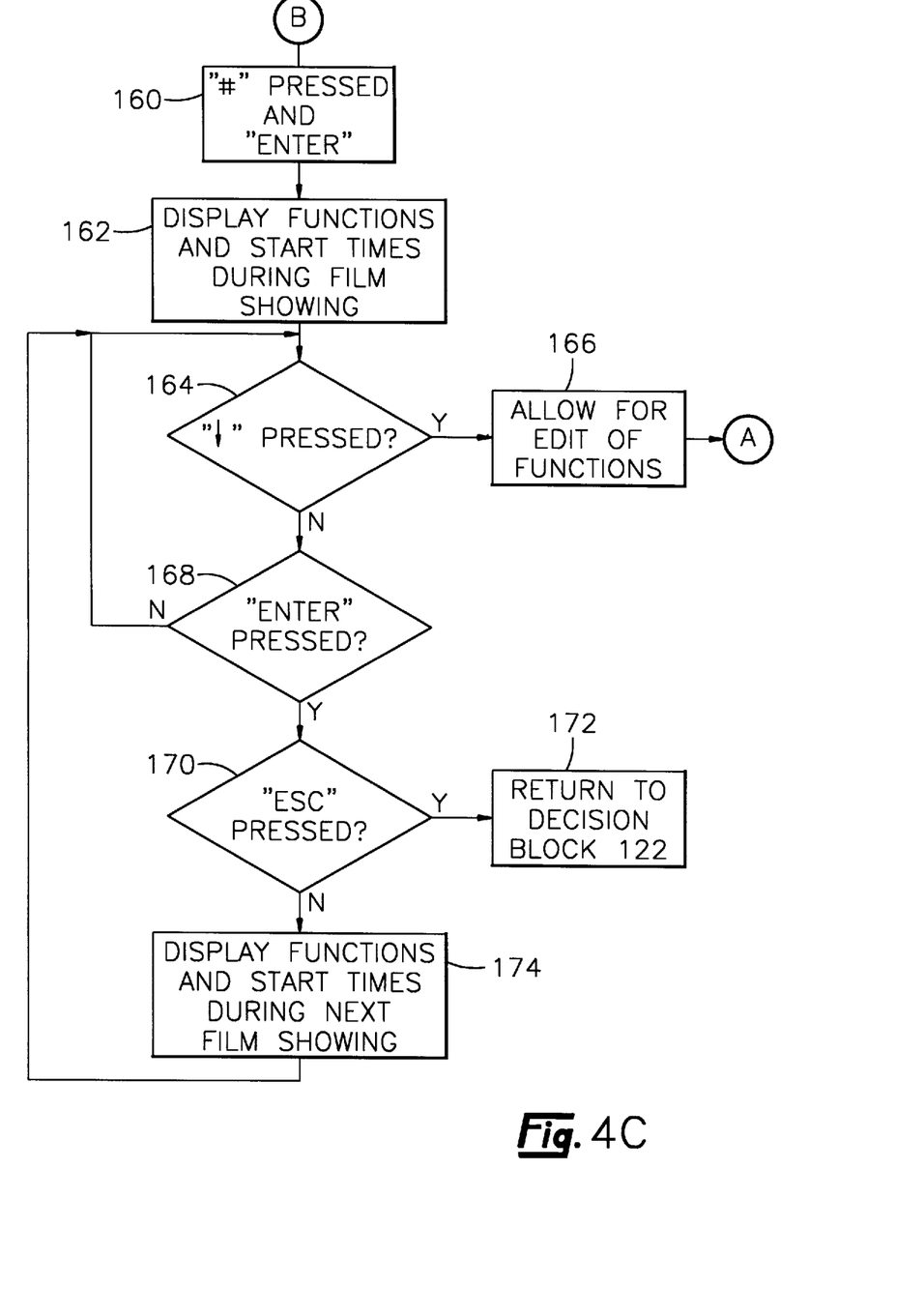

Referring again to FIG. 4A, if the "↓" button has been pressed two times by the operator (block 126), the sequence proceeds to task block 160 in FIG. 4C. If the "#" button has been pressed along with the "Enter" button in task block 160, the sequence proceeds to task block 162 whereby the control functions and start times of the control functions during showing of the film are displayed on the LCD panel. The sequence then proceeds to decision block 164 whereby it is determined whether the "↓" button has been pressed again. If it has, the sequence traverses to task block 166 whereby the operator is allowed to edit the control functions by returning to the method of 4B. If, however, the "↓" button has not been pressed, the sequence continues to decision block 168 whereby it is determined whether the "Enter" button has been pressed. If it has not, the sequence loops back to the top of decision block 164. If, however, it is determined that the "Enter" button has been pressed the sequence continues to decision block 170 whereby it is determined whether the "ESC" button has been pressed. If it has, the sequence traverses to task block 172 and returns to decision block 122 of FIG. 4A.

If, however, the "ESC" button has not been pressed, the sequence proceeds to task block 174 whereby the control functions and associated start times during the showing of the next film are displayed on the LCD panel. The sequence then loops back to the top of decision block 164.

Figure 4D:
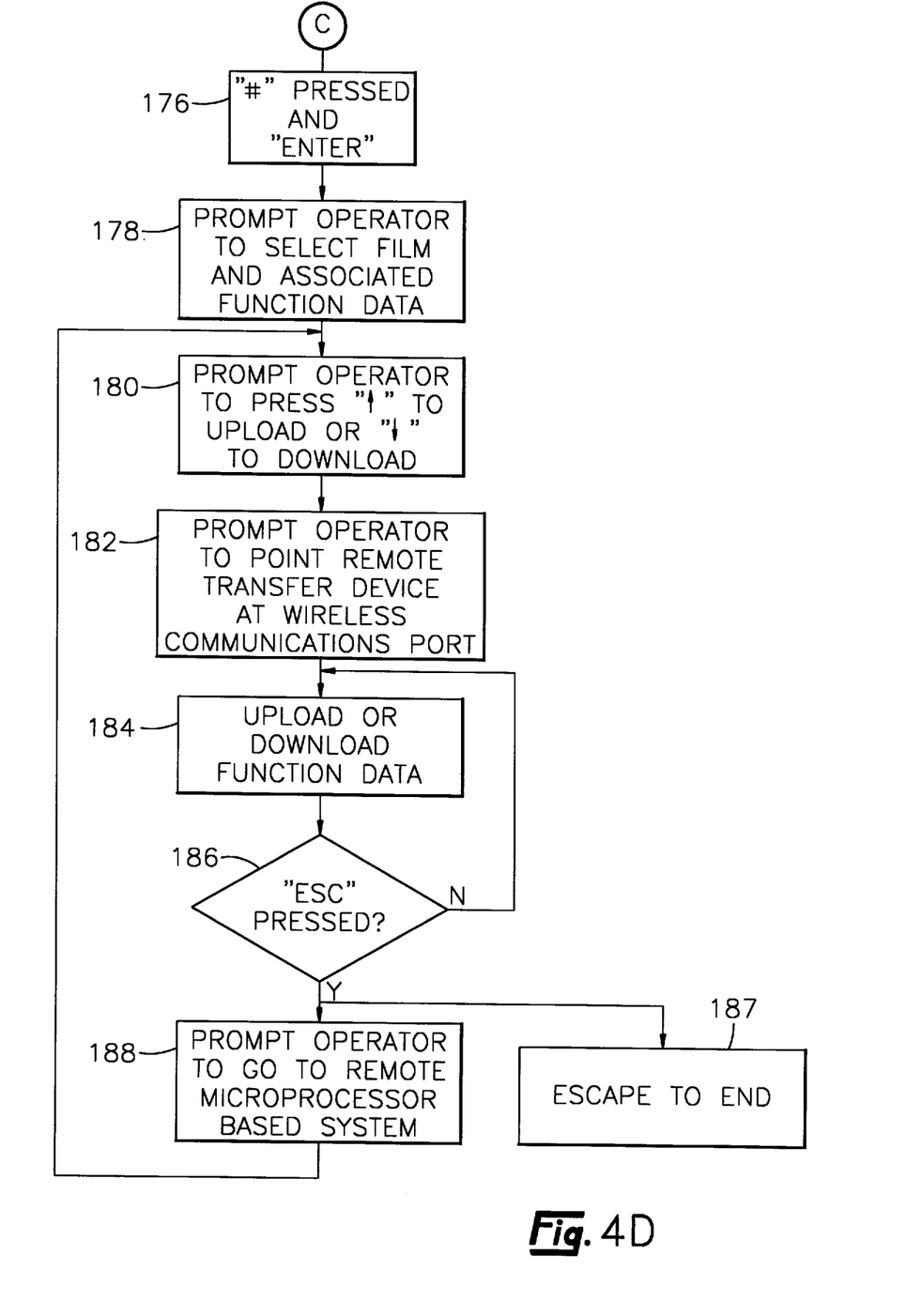

Returning now to FIG. 4A, if it is determined in task block 130 that the "↓" button has been pressed three times by the operator, the sequence traverses to FIG. 4D whereby transferring of the control functions is enabled. In task block 176 if the operator has pressed the "#" button along with the "Enter" button, the sequence proceeds to task block 178 whereby the operator is prompted to select control functions for a particular film for uploading via the wireless communications port to the remote transfer device.

The sequence then proceeds to task block 180 whereby the operator is prompted to press the "↑" to upload or "↓" to download to another microprocessor based system 14. The prompting is all displayed on the LCD panel but could also be displayed on the remote transfer device. The sequence then proceeds to task block 182 whereby the operator is prompted to point the remote transfer device at the wireless communications port. It is understood, however, that if an RF transmitter/receivers used in the wireless communications port "sight line" communication will not be required to communicate with the wireless communications port of the remote transfer device.

The sequence next proceeds to task block 184 whereby the control functions are uploaded to the remote transfer device or downloaded to another microprocessor based system 14', depending on the particular application. The sequence then proceeds to decision block 186 whereby it is determined whether the "ESC" button has been pressed by the operator or if it is pressed twice at block 187 the method ends. If it has not, the sequence loops back to the top of task block 184. If, however, it is determined that the "ESC" button has been pressed the sequence proceeds to task block 188 whereby the operator is prompted to take the remote transfer device to the remote microprocessor based system 14 and download the control functions thereto. The sequence then loops back to the top of task block 180.

Figure 4E:
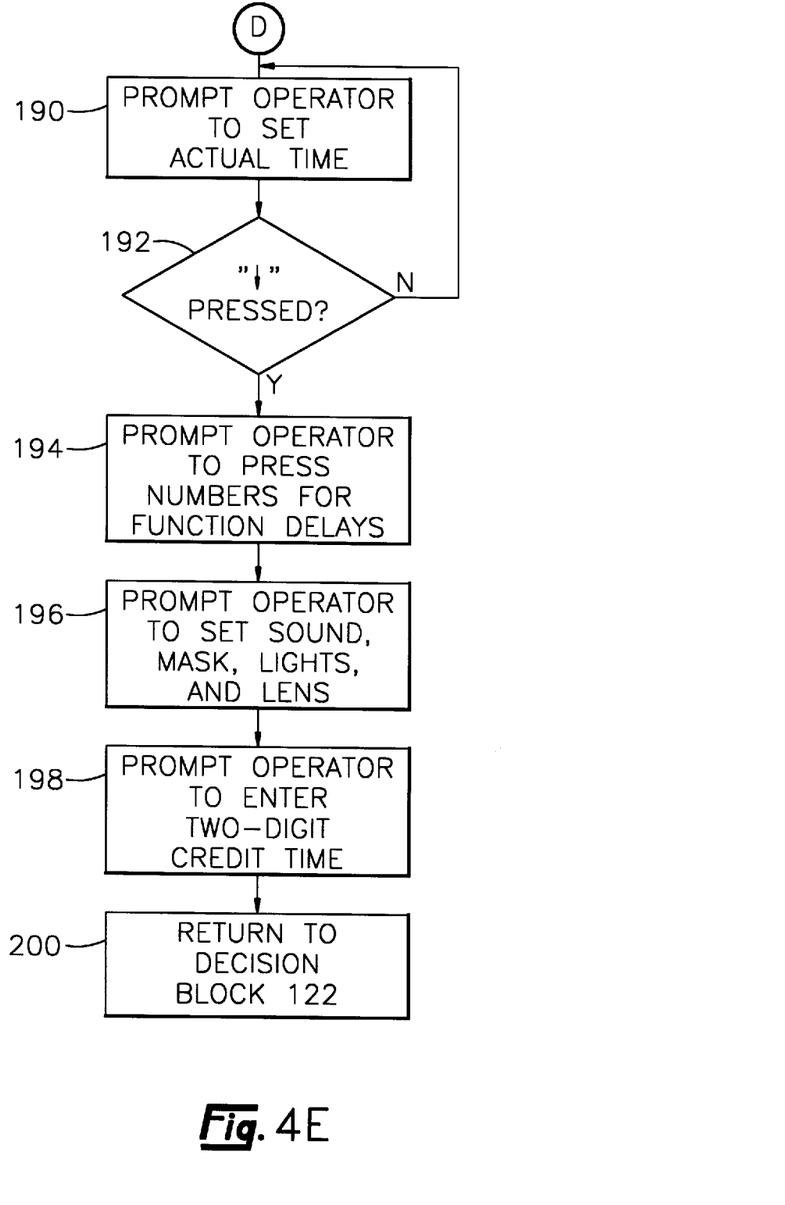

Referring again to FIG. 4A, if the "↓" button has been pressed four times by the operator (block 132), the sequence proceeds to task block 190 of FIG. 4E. In task block 190 the operator is prompted to set the actual time via the hex keypad, and the sequence proceeds to decision block 192 whereby it is determined if the "↓" button has been pressed. If it has not, the sequence loops back to the top of task block 190. If, however, it is determined in decision block 192 that the "↓" button has been pressed the sequence proceeds to task block 194 whereby the operator is prompted to press a sequence of numbers on the hex keypad for delaying operation of the control functions while the film is shown. The sequence then proceeds to task block 196 whereby the operator is prompted to set new control functions for the speaker system, light system, masks and lens system for the showing of the film. The sequence next proceeds to task block 198 whereby the operator is prompted to enter a 2-digit credit time for showing of the credits of the film. The sequence next proceeds to task block 200 and returns to decision block 122 of FIG. 4A.

As will be appreciated, the invention offers significant advantages and enables enhanced control over sensory components of the presentation of a motion picture. For example, a variety of sensory components may be repeatedly changed throughout the showing of a motion picture in a manner such that subsequent showings of a film are identical to the first showing. Advantageously this is accomplished without the need for cue tape and its associated limits and problems and/or constant operator vigilance.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A system for enhancing the presentation of a motion picture film, the system comprising:

motion picture film presentation means for outputting audio and video content of the film for observance by an audience;

an audio output controller having a plurality of selectable audio operating parameters corresponding to a plurality of desired audio outputs of the film;

a video output controller having a plurality of selectable video operating parameters corresponding to a plurality of desired video outputs of the film; and a presentation controller in electrical communication with the audio and video output controllers for selectively controlling the desired audio and video outputs of the film as a function of time as measured from a time corresponding to the beginning of the output of audio and video content of the film via the film presentation means, the presentation controller comprising:

a microprocessor in electrical communication with a clock, input means in electrical communication with the microprocessor for inputting information corresponding to the desired audio and video outputs of the film, the input means generating input signals in response to the input information, memory for storing the input signals as a function of time as measured from a time corresponding to the beginning of the output of audio and video content of the film via the film presentation means, a display for displaying to the operator the selected audio and video operating parameters as a function of time as measured from a time corresponding to the beginning of the output of audio and video content of the film via the film presentation means, and wherein the microprocessor generates output signals at desired times corresponding to the input signals, with the audio and video output controllers each being responsive to the output signals such that the audio and video content of the film observable by the audience corresponds as a function of time to the desired audio and video outputs of the film.

2. The system of claim 1, wherein the audio operating parameters comprise analog and digital sound modes.

3. The system of claim 1, wherein the video output controller comprises an electrically switchable lens system having a flat lens and a scope lens and means for switching therebetween.

4. The system of claim 1 further comprising a plurality of lights visible to the audience and a light controller having a plurality of light operating parameters corresponding to a plurality of selectable lighting settings, wherein the input means of the presentation controller further generates input signals corresponding to information input via the input means by the operator which corresponds to the plurality of selectable lighting setting and the light controller being responsive to the output signals generated by the microprocessor such that the lights visible to the audience correspond to the selectable lighting settings as a function of time.

5. The system of claim 1, wherein the input means comprises a keyboard, control buttons, and indicators corresponding to selectable criteria.

6. The system of claim 1 wherein the selectable criteria comprises of audio and video operating parameters.

7. A system for enhancing the presentation of a motion picture film, the system comprising:

a plurality of theater operation systems;

output controller means operatively associated with the plurality of theater operation systems, the output controller means having a plurality of operating parameters corresponding to a plurality of desired operational parameters associated with each of the plurality of theater operation systems; and a presentation controller in electrical communication with the output controller means for selectively controlling the desired operational parameters as a function of time, the presentation controller comprising:

a microprocessor in electrical communication with a clock, input means in electrical communication with the microprocessor for inputting information, corresponding to selected ones of the desired output parameters into the presentation controller by an operator as a function of time as measured from the commencement of the presentation of the motion picture film, the input means generating input signals in response to the input information, memory disposed in the microprocessor for storing the input signals as a function of time, a display for displaying to the operator the desired operational parameters as a function of time, and wherein the microprocessor generates output signals at desired times corresponding to the input signals, with the output controller means being responsive to the output signals so that the operational parameters of the theater operation systems correspond as a function of time to the desired operational parameters.

8. The system of claim 7 wherein the plurality of theater operation systems comprises a sound system, a light system, and a lens system and the output controller means comprises a plurality of control panels, one each electrically coupled to the sound system, the light system and the lens system, each control panel comprising an electrically controllable switch having a plurality of settings, each setting corresponding to an operational setting of the sound or light or lens system to which it is coupled.

* * * * *